United States Patent [19]

Niwa et al.

[11] Patent Number: 5,306,090
[45] Date of Patent: Apr. 26, 1994

[54] SLIDING ROLLER BEARING HAVING ROLLING MEMBERS

[75] Inventors: Kosaburo Niwa; Hideyumi Matsumura, both of Nagoya, Japan

[73] Assignee: Daido Metal Company Ltd., Nagoya, Japan

[21] Appl. No.: 114,362

[22] Filed: Sep. 1, 1993

[30] Foreign Application Priority Data

Sep. 18, 1992 [JP] Japan .................................. 4-249678

[51] Int. Cl.$^5$ ............................................ F16C 21/00
[52] U.S. Cl. .................................... 384/91; 384/129; 384/322; 384/569
[58] Field of Search ................. 384/91, 129, 548, 569, 384/322, 462

[56] References Cited

U.S. PATENT DOCUMENTS

| | | | |
|---|---|---|---|
| 3,920,293 | 11/1975 | Takeuchi | 384/129 |
| 4,603,982 | 8/1986 | Dittrich | 384/129 |
| 4,976,551 | 12/1990 | Scharting et al. | 384/569 |
| 5,154,517 | 10/1992 | Hodge | 384/569 |

*Primary Examiner*—Lenard A. Footland
*Attorney, Agent, or Firm*—Browdy and Neimark

[57] ABSTRACT

A plurality of retaining grooves for rolling members are arranged in the inner cylinder. The retaining grooves have semicircular bottom halves and top halves having sector-shaped sections diverging radially outwardly. The rolling members are accommodated in the bottom halves of the retaining grooves and grease fills the top halves. Then, the inner cylinder is fit into the outer cylinder. In rotating the bearing, the rolling members are rotated by the bottom halves of the retaining grooves serving as a sliding bearing and rolled on the inner peripheral surface of the outer cylinder. When a heavy load is applied, the rolling members are pushed down to the same level as the outer peripheral surface of the inner cylinder, thereby distributing and supporting the load by the outer peripheral surface of the inner cylinder and the rolling members. Therefore, the present invention can provide a roller bearing which is made compact by omitting the retainer for the rolling members and which exhibits good lubrication performance and endurance, avoiding vibration and noises.

8 Claims, 4 Drawing Sheets

SLIDING ROLLER BEARING HAVING ROLLING MEMBERS

BACKGROUND OF THE INVENTION

1. Field of the Invention

The present invention relates to a sliding roller bearing obtained by improvement of a small roller bearing comprising inner and outer cylinders and a plurality of cylindrical rollers which are circumferentially spaced apart from each other intervening between inner and outer cylinders.

2. Description of the Related Art

Generally, a roller bearing is characterized in that rolling members, such as balls and rollers, used as machine elements susceptible to a load are rolled between inner and outer races. The typical examples of this type of bearing are shown as follows; a conventionally known ball bearing in FIG. 5; a cylindrical roller bearing in FIG. 6; a shell type needle roller bearing in which the needle rollers roll between the outer race and the shaft in FIGS. 7 and 8; and a solid type needle roller bearing in which the needle rollers roll between inner and outer rollers in FIG. 9. The foregoing conventional roller bearings are constructed such that the rollers rotate and revolve, thus withstanding a load by rolling contact.

In the needle roller bearing among the above-mentioned roller bearings, the needle rollers are retained by a retainer and intervene between the shaft and the outer race, or between the inner and outer races. When the thin needle rollers, that is the needles, rotate, they are likely to skewed and further twisted, thus impairing endurance and causing noises and vibration.

Also, when hardened thin needles are used for a conventional bearing with a view to increasing loadcarrying capacity, stress occurring on a contact point is likely to increase locally. Hence, the load cannot be supported completely only by rolling the rollers. Further, when the shaft diameter is small, the number of needles for supporting the shaft is inevitably decreased, and therefore, the carrying capacity per one needle must be increased.

Concerning lubrication, the use of the needle roller bearing in the oil causes no problem, whereas grease lubrication easily causes grease scattering, thus impairing endurance. On the other hand, the use of a seal also causes some problems such as the enlargement of the periphery of the bearing and troublesome handling.

SUMMARY OF THE INVENTION

Accordingly, in view of the foregoing problems, an object of the present invention is to provide a compact bearing obtained by improving not only a needle roller bearing but also an ordinary roller bearing using cylindrical rollers.

In order to achieve the above object, the present invention provides a sliding roller bearing including an outer cylinder, an inner cylinder and a plurality of cylindrical rolling members which intervene between the inner and outer cylinders, circumferentially spaced apart from each other; the bearing comprising: a plurality of retaining grooves extending axially on the outer peripheral surface of the inner cylinder and retaining the rolling members; the retaining grooves including bottom halves having generally semicircular sections so as to retain the rolling members slidably brought into contact with the bottom halves, the grooves including top halves having sector-shaped sections diverging radially outwardly; the rolling members and the outer peripheral surface of the inner cylinder brought into contact with the inner peripheral surface of the outer cylinder when a heavy load is applied, thereby distributing and supporting the load by both the rolling members and the outer peripheral surface of the inner cylinder.

In a further preferred embodiment of the present invention, at least one oil groove extending along the axis may be arranged in a suitable place in the inside of the bottom half of the rolling-member retaining groove.

The bearing of the present invention is constructed as stated above. Thus, when the inner cylinder fit around the rotatable shaft rotates together with the rotatable shaft, the rolling members retained by the retaining grooves of the inner cylinder are turned by contacting along the inner peripheral surface of the outer cylinder, and also slide against the bottom halves of the retaining grooves and rotate as if they were supported by a sliding bearing. Thus, the retainer used for positioning roller members (rollers or needles) in the conventional roller bearing is no longer required. The rolling members can be constantly retained without a retainer in parallel to the axis, thus avoiding skewing of the needles which is likely to occur in the conventional needle bearing.

The rolling members are supported by the overall surfaces of the bottom halves of the retaining grooves such that they are brought into contact with the surface of the bottom halves, thereby avoiding local friction. Also, since a load is distributed and supported by the overall surfaces of the bottom halves of the retaining grooves, it is possible to form the inner cylinder with soft materials such as plastics, bearing alloys, or the like, and accordingly it is possible to slim the inner cylinder. As a result, the bearing can be made compact.

Further, the diameter of the outer periphery of the inner cylinder is made slightly smaller than that of the circle passing along the outermost points of the rolling members retained in the retaining grooves of the inner cylinder. Thus, when a heavy load is applied, the inner cylinder formed of a soft material is deformed so that the rolling members are pushed down to the level of the outer peripheral surface of the inner cylinder. As a result, the load can be distributed and supported by both the rolling members and the outer peripheral portion of the inner cylinder.

The top halves of the sector-shaped retaining grooves which diverge radially outwardly hold the grease effectively, thereby enabling operation over many hours. Moreover, the oil groove arranged axially at the bottom half of the retaining groove enhances more effective grease supply for the rolling members.

DESCRIPTION OF THE PREFERRED EMBODIMENTS

Figure 1:
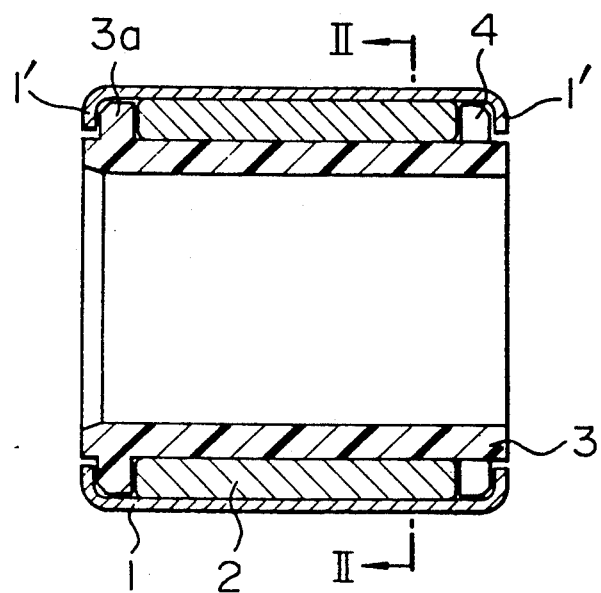
FIG. 1 is a longitudinal sectional view by axially cutting through one embodiment of a sliding roller bearing of the present invention.
Figure 2:
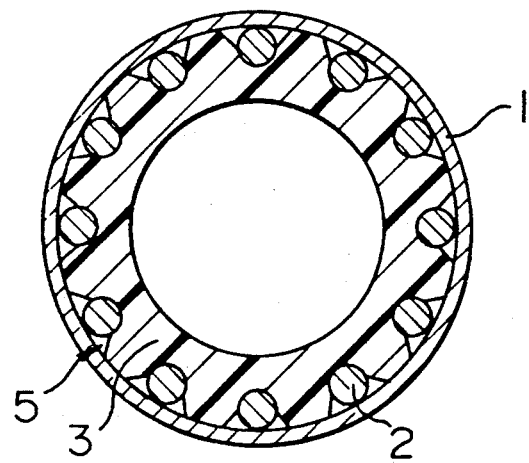
FIG. 2 is a cross sectional view taken on line II—II of FIG. 1.
Figure 3:
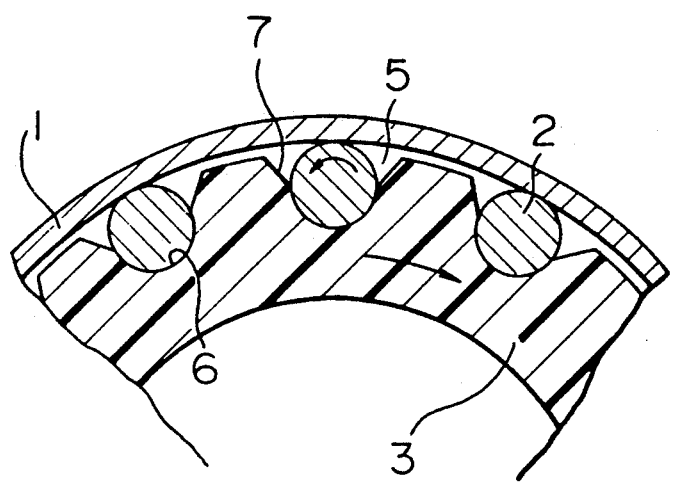
FIG. 3 is an enlarged view of an essential portion of FIG. 2.

FIG. 1 is a longitudinal sectional view along the axis of one embodiment of a sliding roller bearing according to the present invention. FIG. 2 is a cross sectional view of the same embodiment. FIG. 3 is an enlarged view of an essential portion of FIG. 2. The bearing of this embodiment, for example, has an inner diameter of 10 mm, an outer diameter of 14 mm and an axial length of 10 mm. It is constructed primarily of an outer cylinder 1, rolling members 2, an inner cylinder 3 and a collar 4. The outer cylinder 1 is formed of a thin plate which is made of steel or stainless steel. Both ends of the outer cylinder 1 are bent inward at the last stage of assembling the bearing so as to form inward flanges 1' and 1'. A plurality (for example, 10-24) of rolling-member retaining grooves 5 extending parallel to the axis of the bearing are arranged at equal spacing along the outer peripheral surface of the inner cylinder 3. A rolling member 2 is accommodated in each rolling-member retaining groove 5 so as to roll by contacting the inner peripheral surface of the outer cylinder 1.

The rolling-member retaining grooves 5 arranged in the inner cylinder 3 are formed to have semicircular sections so that bottom halves 6 of the grooves 5 can rotatably support the rolling members 2 which are slidably brought into contact therewith. The diameter of the semicircular bottom half 6 is arranged to be slightly greater than that of the rolling member by between 0.005-0.05 times that of the rolling member, thereby achieving a good slidable contacting performance.

Upper halves 7 of the rolling-member retaining grooves 5 are formed to have sector-shaped sections diverging radially outwardly so that the open space around the rolling members 2 can be used as grease grooves, thereby effectively feeding grease to the clearance between the retaining groove bottom half 6 and the rolling member 2. Also, when the sectors of the upper parts 7 are arranged to diverge at an angle of 90 degrees or greater from respective points which are located on a circle having a smaller diameter than that of the circle passing along the central points of all the rolling members, the grease holdings can be increased and grease feeding performance can be even more enhanced.

Figure 4:
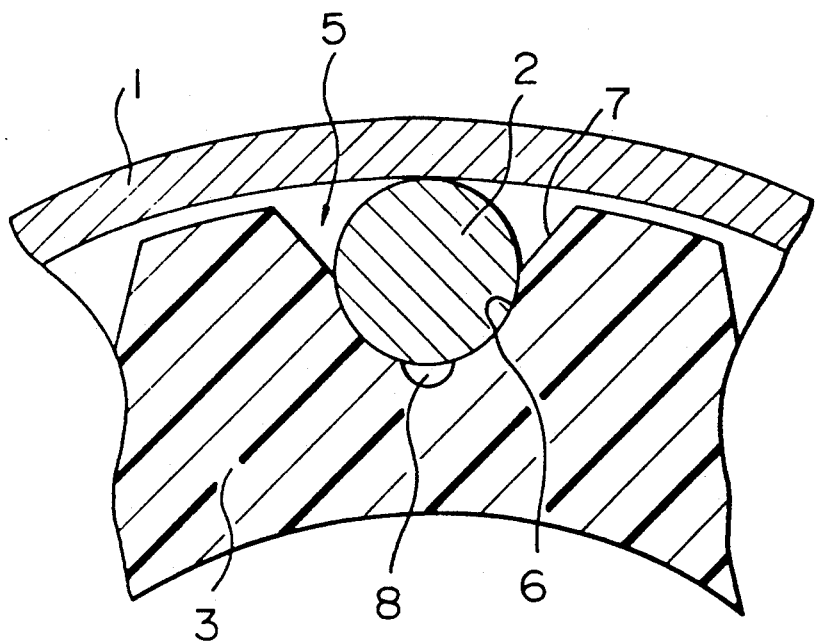
FIG. 4 is an enlarged sectional view of an essential portion of an embodiment in which an oil groove is further arranged at the bottom of a rolling-member retaining groove of an inner cylinder in the bearing shown in FIG. 3.
Figure 5:
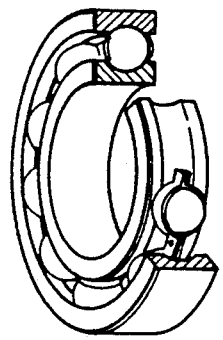
FIG. 5 is a partially broken perspective view of a conventional ball bearing.
Figure 6:
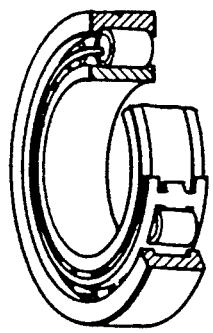
FIG. 6 is a partially broken perspective view of a conventional cylindrical roller bearing.
Figure 7:
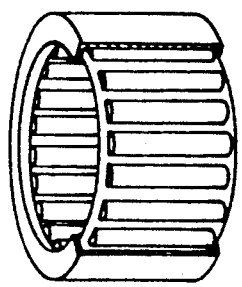
FIG. 7 is a partially broken perspective view of a conventional shell type needle roller bearing.
Figure 8:
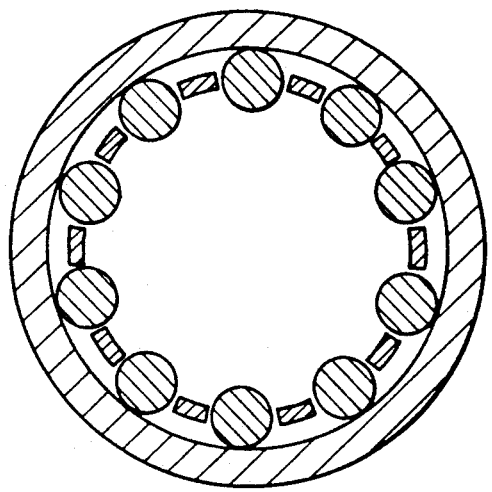
FIG. 8 is a cross sectional view of the shell type needle roller bearing illustrated in FIG. 7.
Figure 9:
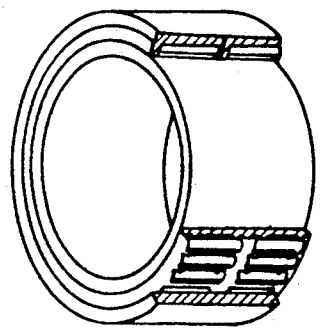
FIG. 9 is a partially broken perspective view of a conventional solid type needle roller bearing.

Further, as shown in FIG. 4, an oil groove 8 is arranged so as to extend axially on the inner surface of the bottom half 6 of the retaining groove 5 of the inner cylinder 3, thereby enhancing the smooth supply of grease to the rolling member 2. Two or three oil grooves 8 may be arranged if necessary.

The bearing of the present invention can be assembled as follows. A rolling member 2 is first inserted into each retaining groove 5 of the inner cylinder 3. Then, the collar 4 is attached to one end of the inner cylinder 3. An end wall 3a integrated into the inner cylinder 3 is left at the other end of the inner cylinder 3. The respective rolling members 2 are thus put between the end wall 3a and the collar 4 so as to be retained in the retaining grooves 5. The outer peripheral surface of the inner cylinder 3 retaining the rolling members 2 as stated above is coated with grease when necessary, and grease is injected into the spaces within the upper halves 7 of the retaining grooves 5. Then, the inner cylinder 3 is inserted into the outer cylinder 1, together with the rolling members 2, and both ends of the outer cylinder 1 are bent inwards, thus completing the assembly.

The inward flanges 1' and 1' obtained by bending both ends of the outer cylinder 1 inward effectively prevent grease from leaking outside of the bearing and foreign particles from entering the inside of the bearing.

The bearing of the present invention is constructed such that the rolling members 2 are supported within the retaining grooves 5 of the inner cylinder 3 in the manner of the sliding roller bearing. Thus, skewing of the rolling members can be prevented, and the load imposed on the rolling member is applied to the overall inside surface of the bottom half 6 of the inner cylinder retaining groove 5. Hence, the load is distributed and the stress applying to the surface of the bottom half 6 is relaxed, thus enabling the use of soft materials such as plastics, bearing alloys, or the like, for the inner cylinder 3.

Further, the use of soft materials is effective in the following respect. The diameter of the outer periphery of the inner cylinder 3 is made smaller than that of the circle passing along the outermost points of the rolling members 2 incorporated into the inner cylinder 3 by 0.001-0.05 times the inner diameter of the inner cylinder. Thus, when a heavy load is applied, the rolling members 2 deform the inner retaining grooves 5 and are pushed down to the level of the outer peripheral surface of the inner cylinder 3, thereby distributing and supporting the load by both the rolling members 2 and the outer peripheral surface of the inner cylinder 3. Hence, carrying capacity of this type of bearing can be improved compared to a conventional bearing in which the load is supported by only the rolling members, thus further enhancing endurance of the bearing.

The foregoing embodiment describes a bearing in which cylindrical rollers are used as rolling members. However, the use of conic rollers may be applicable to the present invention, and in such a case the configurations of the outer cylinder, the inner cylinder and the retaining groove are to be modified accordingly.

As will be clearly understood from the foregoing description, the present invention offers the following advantages.

1) Even though a retainer in addition to an inner race is required for a conventional needle roller bearing, the inner cylinder of the present invention serves as both conventional inner race and retainer, thus decreasing the number of parts and simplifying the construction of the bearing.

2) The conventional needle roller bearing can hardly avoid skewing a thin needle, whereas the bearing of the present invention supports a needle by a retaining groove of the inner cylinder, thereby avoiding skewing and promoting a decrease in vibration, noises and the like.

3) Since the rolling members in the bearing of the present invention are supported in the retaining grooves in the inner cylinder so as to distribute the load as in the sliding bearing, soft materials such as plastics, bearing alloys, or the like, can be used for the inner cylinder, thus widening the applicable range of the product.

4) A combination of the configurations of the inner cylinder which is able to contain a large amount of grease and the outer cylinder of which both ends are bent enables maintenance free bearing operation over a long period.

5) When a heavy load is applied, it can be distributed by the support of both the outer peripheral surface of the inner cylinder and the rolling members, thus enabling slimming of the inner cylinder and providing a compact bearing.

What is claimed is:

1. A sliding roller bearing including an outer cylinder, an inner cylinder and a plurality of cylindrical rolling members which intervene between said inner and outer cylinders, circumferentially spaced apart from each other; said bearing comprising:

a plurality of retaining grooves extending axially on the outer peripheral surface of said inner cylinder and retaining said rolling members;

said retaining grooves including bottom halves having generally semicircular sections so as to retain said rolling members slidably brought into contact with said bottom halves, said grooves including top halves having sector-shaped sections diverging radially outwardly;

said rolling members and said outer peripheral surface of said inner cylinder being brought into contact with the inner peripheral surface of said outer cylinder when a heavy load is applied, thereby distributing and supporting said load by both said rolling members and said outer peripheral surface of said inner cylinder.

2. A sliding roller bearing according to claim 1, wherein each said retaining grooves for said rolling members has at least one axially-extending oil groove at a suitable place within said bottom halves.

3. A sliding roller bearing according to claim 2, wherein said top halves of said retaining grooves have sector-shaped sections diverging radially outwardly at an angle of 90 degrees or greater from respective points which are located on a circle having a smaller diameter than that of the circle passing along the central points of said rolling members; said rolling member retained by said bottom halves so as to be slidably brought into contact with each other.

4. A sliding roller bearing according to claim 1, wherein the diameter of said bottom halves having semicircular sections of said retaining grooves for said rolling members is made greater by 0.005–0.05 times the diameter of said rolling members.

5. A sliding roller bearing according to claim 4, wherein each said retaining grooves for said rolling members has at least one axially-extending oil groove at a suitable place within said bottom halves.

6. A sliding roller bearing according to claim 1, wherein the diameter of said outer periphery of said inner cylinder is made smaller than that of the circle passing along outermost points of said rolling members retained by said retaining grooves by 0.001–0.05 times the inner diameter of said inner cylinder.

7. A sliding roller bearing according to claim 5, wherein each said retaining grooves for said rolling members has at least one axially-extending oil groove at a suitable place within said bottom halves.

8. A sliding roller bearing according to claim 1, wherein said top halves of said retaining grooves have sector-shaped sections diverging radially outwardly at an angle of 90 degrees or greater from respective points which are located on a circle having a smaller diameter than that of the circle passing along the central points of said rolling members; said rolling member retained by said bottom halves so as to be slidably brought into contact with each other.

* * * * *